US012682432B2

(12) United States Patent
Liu et al.

(10) Patent No.: US 12,682,432 B2
(45) Date of Patent: Jul. 14, 2026

(54) HYBRID SAMPLING FOR DIFFUSION MODELS

(71) Applicant: ADOBE INC., San Jose, CA (US)

(72) Inventors: Difan Liu, San Jose, CA (US);
Siddharth Iyer, San Francisco, CA
(US); Ryan Joe Murdock, American
Fork, UT (US)

(73) Assignee: ADOBE INC., San Jose, CA (US)

( * ) Notice: Subject to any disclaimer, the term of this
patent is extended or adjusted under 35
U.S.C. 154(b) by 383 days.

(21) Appl. No.: 18/452,150

(22) Filed: Aug. 18, 2023

(65) Prior Publication Data

US 2025/0061548 A1      Feb. 20, 2025

(51) Int. Cl.
 *G06T 5/70* (2024.01)
 *G06T 5/50* (2006.01)
(52) U.S. Cl.
 CPC .................. *G06T 5/70* (2024.01); *G06T 5/50*
 (2013.01); *G06T 2207/20084* (2013.01)
(58) Field of Classification Search
 None
 See application file for complete search history.

(56) References Cited

U.S. PATENT DOCUMENTS

2022/0107378 A1\*  4/2022  Dey ......................... G06N 3/09

FOREIGN PATENT DOCUMENTS

| CN | 107689034 B | \* 12/2020 | ............. G06N 3/045 |
| CN | 116596813 A | \* 8/2023 | ............... G06T 5/50 |

OTHER PUBLICATIONS

Ho, et al., "Denoising Diffusion Probabilistic Models", arXiv preprint
arXiv:2006.11239v2 [cs.LG] Dec. 16, 2020, 25 pages.
Song, et al., "Denoising Diffusion Implicit Models", arXiv preprint
arXiv:2010.02502v4 [cs.LG] Oct. 5, 2022, 22 pages.
Lu, et al., "DPM-Solver++: Fast Solver for Guided Sampling of
Diffusion Probabilistic Models", arXiv:2211.01095v2 [cs.LG] May
6, 2023, 24 pages.
Saharia, et al., "Photorealistic Text-to-Image Diffusion Models with
Deep Language Understanding", arXiv preprint arXiv:2205.
11487v1 [cs.CV] May 23, 2022, 46 pages.
Nichol, et al., "Improved Denoising Diffusion Probabilistic Mod-
els", arXiv:2102.09672v1 [cs.LG] Feb. 18, 2021, 17 pages.
Karras, et al., "Elucidating the Design Space of Diffusion-Based
Generative Models", arXiv preprint arXiv:2206.00364v2 [cs.CV]
Oct. 11, 2022, 47 pages.

\* cited by examiner

*Primary Examiner* — David Ometz
(74) *Attorney, Agent, or Firm* — F. CHAU &
ASSOCIATES, LLC

(57)      ABSTRACT

Systems and methods for generating images using hybrid
sampling include obtaining a noisy image and generating a
first denoised image during a first reverse diffusion phase
using a diffusion neural network. The first denoised image is
generated based on a first sampler that uses a first sampling
density during at least a portion of the first reverse diffusion
phase. Subsequently, a second denoised image is generated
based on the first denoised image during a second reverse
diffusion phase using the diffusion neural network. The
second denoised image is generated based on a second
sampler that uses a second sampling density different from
the first sampling density during at least a portion of the
second reverse diffusion phase.

20 Claims, 13 Drawing Sheets

300 "A corgi lives in a house made out of sushi"

305 Text Encoder

310

315 Diffusion Neural Network

320

325 Upscaling Component

330

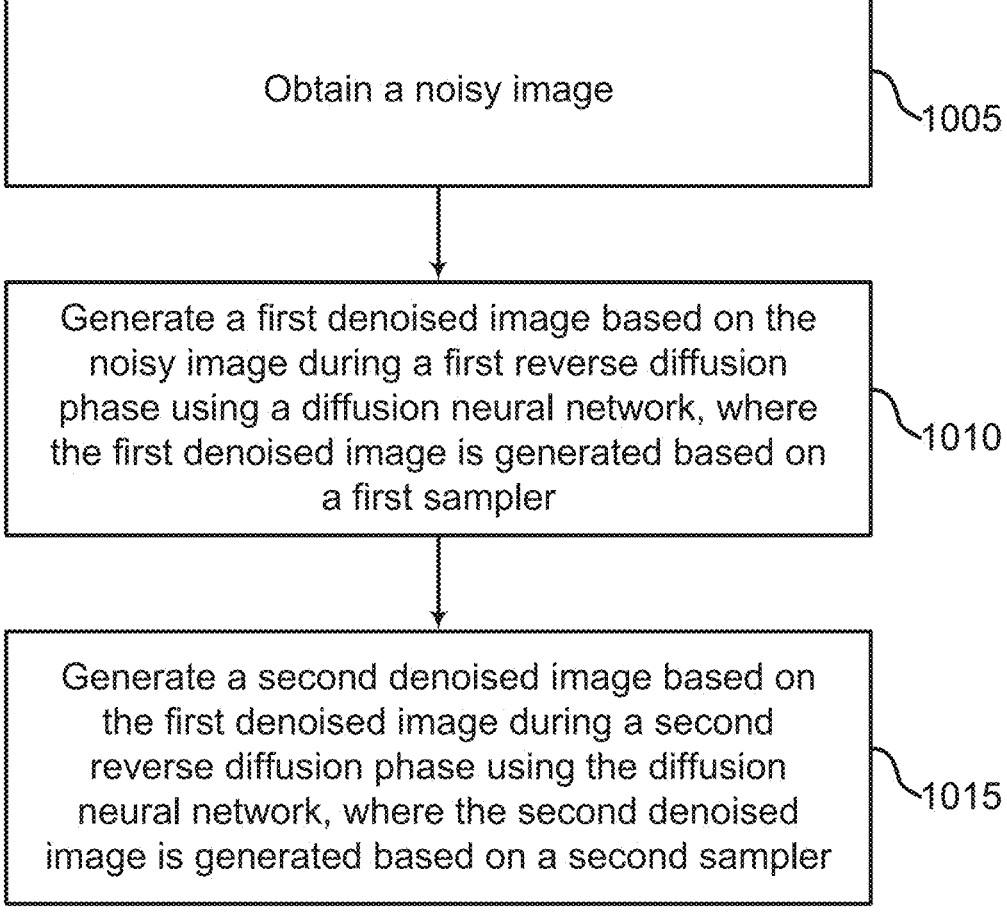

Obtain a noisy image ⟍1005

Generate a first denoised image based on the noisy image during a first reverse diffusion phase using a diffusion neural network, where the first denoised image is generated based on a first sampler ⟍1010

Generate a second denoised image based on the first denoised image during a second reverse diffusion phase using the diffusion neural network, where the second denoised image is generated based on a second sampler ⟍1015

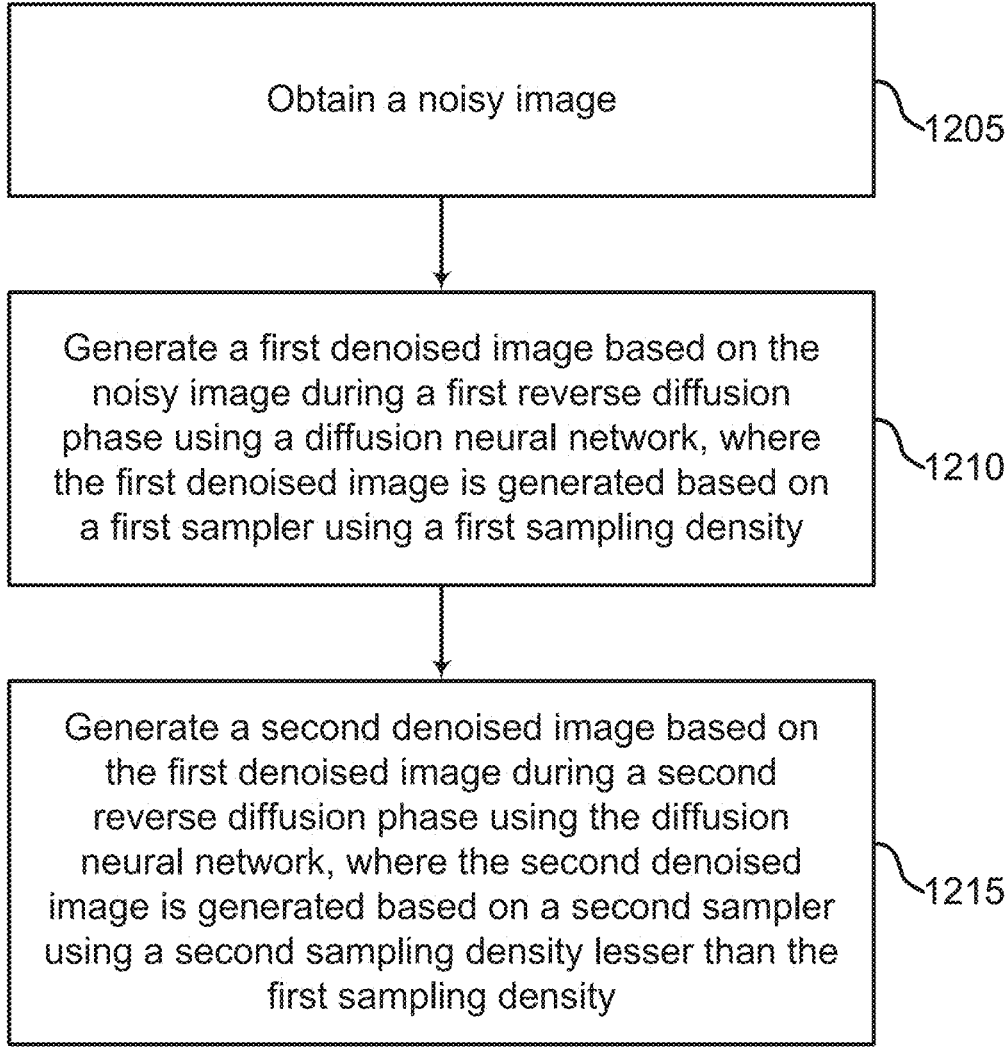

Obtain a noisy image

~1205

Generate a first denoised image based on the noisy image during a first reverse diffusion phase using a diffusion neural network, where the first denoised image is generated based on a first sampler using a first sampling density

~1210

Generate a second denoised image based on the first denoised image during a second reverse diffusion phase using the diffusion neural network, where the second denoised image is generated based on a second sampler using a second sampling density lesser than the first sampling density

Figure 13:
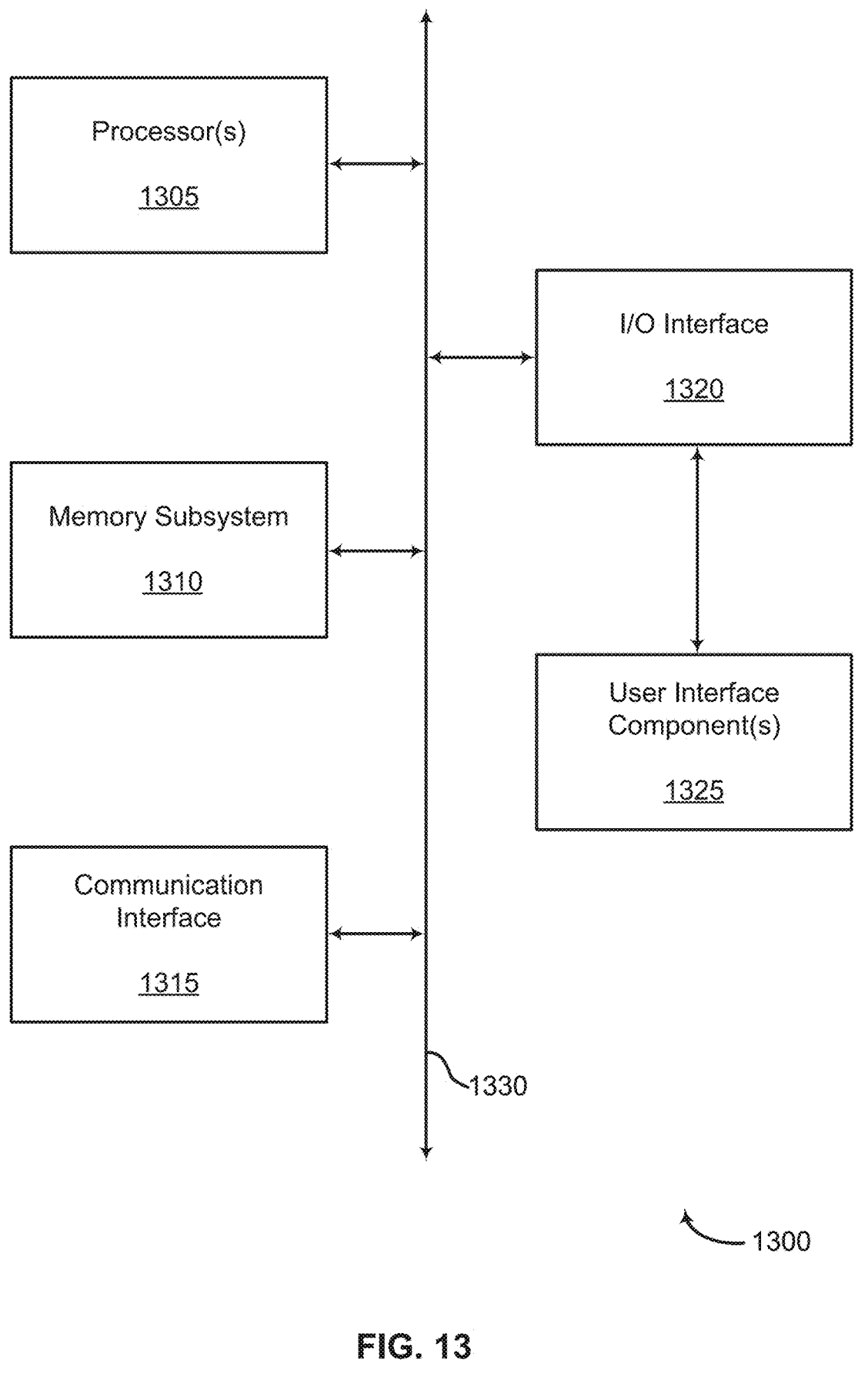

Processor(s)

1305

I/O Interface

1320

Memory Subsystem

1310

User Interface
Component(s)

1325

Communication
Interface

HYBRID SAMPLING FOR DIFFUSION MODELS

BACKGROUND

The following relates generally to machine learning, and more specifically to generative diffusion models. Machine learning refers to the use of computers to process data using learned functions. Recently, diffusion probabilistic models (DPMs) have achieved state of the art performance in various generation tasks, including generating audio and visual data. DPMs include stochastic processes that model the evolution of a system over time, and can incorporating random fluctuations in the underlying dynamics of the system during inference. DPMs typically include a sampler that solves diffusion ordinary differential equations to make iterative predictions. This iterative process allows the model to generate data with stability as well as diversity.

SUMMARY

Embodiments include an image generation apparatus configured to generate images with multiple sampling methods. In the context of diffusion models, sampling refers to a component of the model that is configured to generate a new sample, or data point, from the model. A sampler iteratively reduces the noise in the data during a reverse diffusion process to reveal an underlying signal. Embodiments of the present disclosure include multiple samplers that denoise the data. In some cases, the samplers denoise the data at different rates. In some cases, the samplers re-inject noise after a denoising step during early iterations in the reverse diffusion process, and do not inject noise during later iterations. Some embodiments utilize one differential equation solver during early iterations, and a different differential equation solver in later iterations. This hybrid sampling process allows embodiments to generate data with fewer iterations and increased efficiency.

A method, apparatus, non-transitory computer readable medium, and system for generative diffusion models are described. One or more aspects of the method, apparatus, non-transitory computer readable medium, and system include obtaining a noisy image; generating a first denoised image based on the noisy image during a first reverse diffusion phase using a diffusion neural network, wherein the first denoised image is generated based on a first sampler; and generating a second denoised image based on the first denoised image during a second reverse diffusion phase using the diffusion neural network, wherein the second denoised image is generated based on a second sampler.

A method, apparatus, non-transitory computer readable medium, and system for generative diffusion models are described. One or more aspects of the method, apparatus, non-transitory computer readable medium, and system include obtaining a noisy image; generating a first denoised image based on the noisy image during a first reverse diffusion phase using a diffusion neural network; injecting noise into the first denoised image during the first reverse diffusion phase; and generating a second denoised image based on the first denoised image and the noise injection from the first reverse diffusion phase, wherein the second denoised image is generated during a second reverse diffusion phase using the diffusion neural network without injecting noise during the second reverse diffusion phase.

An apparatus, system, and method for generative diffusion models are described. One or more aspects of the apparatus, system, and method include at least one processor; at least one memory including instructions executable by the processor; a diffusion neural network comprising parameters stored in the at least one memory, wherein the diffusion neural network is configured to compute noise of a noisy image; a first sampler configured to remove noise based on an output of the diffusion neural network during a first reverse diffusion phase; and a second sampler configured to remove noise based on an output of the diffusion neural network during a second reverse diffusion phase.

BRIEF DESCRIPTION OF THE DRAWINGS

FIG. 10 shows an example of a method for generating an image according to aspects of the present disclosure.

FIG. 12 shows an example of a method for generating an image using hybrid sampling according to aspects of the present disclosure.

FIG. 13 shows an example of a computing device according to aspects of the present disclosure.

DETAILED DESCRIPTION

Figure 1:
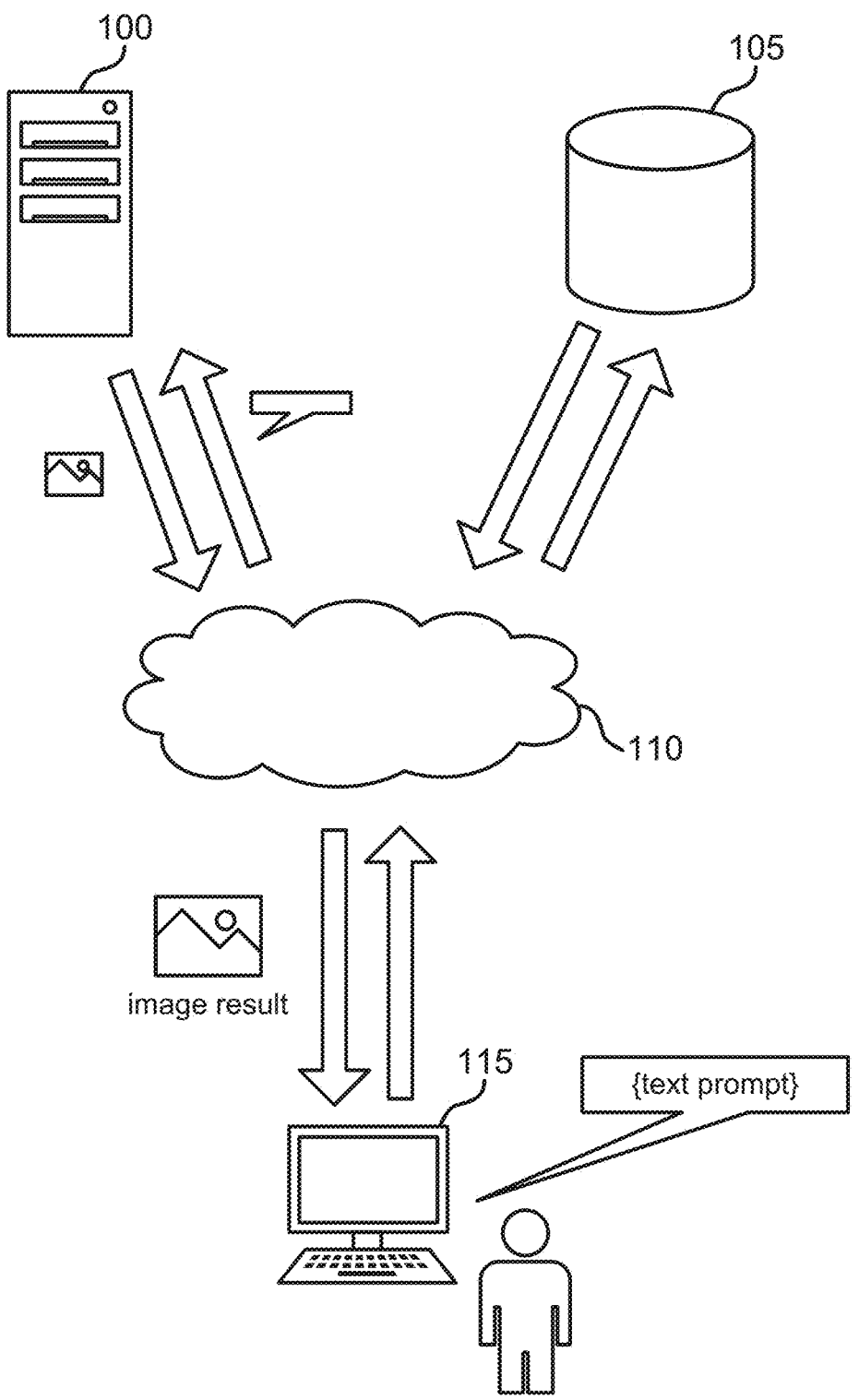
FIG. 1 shows an example of an image generation system according to aspects of the present disclosure.

Machine learning models are used for many applications, including classification, series forecasting, and data generation. Generative models, such as diffusion probabilistic models (DPMs), are able to generate various types of data such as continuous variables, binary variables, count data, and categorical data. They can further generate media data such as images, videos, and music. The data can be conditionally generated, e.g., by providing a starting point such as an image or text prompt, allowing the DPM to produce models that adhere to a user's design wishes.

DPMs include both a forward process and a reverse process. During the forward diffusion process, the DPM iteratively adds noise to an image to create noisy images. This process is typically used by the DPM during a training process. Rather than store several variations of each training image with different noise levels, however, the model is configured to add a predetermined amount of noise for a given timestep. In this way, the model can learn to denoise images for a given timestep during the reverse process. The DPM includes a neural network that estimates the reverse process to generate meaningful images from noisy data.

DPMs typically include 1000 or more iterations for the forward diffusion process during training for each image, and the same number for the reverse diffusion process during generation. Having many iterations allows the model to capture complex dependencies in the data distribution. However, during inference, having a large number of iterations can cause slow generation speeds. If the model is stored and run on a home PC, for example, the model may compute for several minutes to generate a single image.

Some implementations of DPMs attempt to skip iterations to reduce inference times. However, the sampling processes of these DPMs do not allow for accurate generation with reduced timesteps. Depending on the sampling method used, the generated images can lack details or have a poor text-image alignment.

In contrast, embodiments of the present invention use a hybrid sampling method with multiple samplers during the generation (i.e., reverse diffusion) process. For example, a first sampler of an embodiment may sample according to a higher sampling density, and a second sampler may sample according to a lower density with greater denoising in each timestep. In some embodiments, a first sampler instructs a noise component to re-inject noise during the first timesteps of the generation process, and the second sampler does not inject the noise. Embodiments further include a first sampler that denoises based on a lower-order differential equation solver, and a second sampler that denoises based on a higher-order differential equation solver.

Accordingly, embodiments include two or more samplers to perform hybrid sampling during image generation. Embodiments improve on existing image generation models by enabling the generation of detailed images with accurate text-image alignment in as few as 50 iterations.

An image generation system is described with reference to FIGS. 1-3. A diffusion neural network and diffusion process is described with reference to FIGS. 4-7. Hybrid sampling methods are described with reference to FIGS. 8-12. A computing device configured to implement an image generation apparatus is described with reference to FIG. 13.

Image Generation System

An apparatus configured to generate images is described. One or more aspects of the apparatus include at least one processor; at least one memory including instructions executable by the processor; a diffusion neural network comprising parameters stored in the at least one memory, wherein the diffusion neural network is configured to compute noise of a noisy image; a first sampler configured to remove noise based on an output of the diffusion neural network during a first reverse diffusion phase; and a second sampler configured to remove noise based on an output of the diffusion neural network during a second reverse diffusion phase.

In some aspects, the first sampler injects noise during the first reverse diffusion phase, and the second sampler does not inject noise during the second reverse diffusion phase. In some aspects, the diffusion neural network comprises a U-net architecture.

Some examples of the apparatus, system, and method further include a third sampler configured to remove noise based on an output of the diffusion neural network during a third reverse diffusion phase. In at least some embodiments, the third sampler shares one or more aspects with the first sampler, such as sampling density, an order of the differential equation solver, or a configuration for injecting noise.

FIG. 1 shows an example of an image generation system according to aspects of the present disclosure. The example shown includes image generation apparatus 100, database 105, network 110, and user interface 115. Image generation apparatus 100 is an example of, or includes aspects of, the corresponding element described with reference to FIG. 2.

In an example, a user provides a text prompt to image generation apparatus 100 through user interface 115. The text prompt may describe various objects or scenes the user wishes to include in a generated image. Network 110 then transfers the text prompt to image generation apparatus 100. Image generation apparatus 100 processes the prompt to generate an image with increased inference speed. Embodiments of image generation apparatus 100 include a machine learning model, and in some cases, parameters thereof are stored in database 105. Finally, the system provides the generated image to the user through user interface 115.

Embodiments of image generation apparatus 100 are implemented on a server. A server provides one or more functions to users linked by way of one or more of the various networks. In some cases, the server includes a single microprocessor board, which includes a microprocessor responsible for controlling all aspects of the server. In some cases, a server uses the microprocessor and protocols to exchange data with other devices/users on one or more of the networks via hypertext transfer protocol (HTTP), and simple mail transfer (SMTP), although other protocols such as file transfer protocol (FTP), and simple network 110 management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus. In at least one embodiment, one or more components of image generation apparatus 100 are implemented on a user's personal device, such as a phone or laptop.

Database 105 is configured to store various data and information used by the image generation system. For example, database 105 may store parameters of a machine learning model included in image generation apparatus 100. A database is an organized collection of data. For example, a database stores data in a specified format known as a schema. A database may be structured as a single database, a distributed database, multiple distributed databases, or an emergency backup database. In some cases, a database controller may manage data storage and processing in database 105. In some cases, a user interacts with the database controller through an interface, such as user interface 115. In other cases, the database controller may operate automatically without user interaction.

Network 110 facilitates the transfer of information between a user, image generation apparatus 100, and database 105. In some cases, network 100 is referred to as a "cloud." A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

A user interface enables interactions between a user and a device. In some embodiments, user interface 115 may include an audio device, such as an external speaker system, an external display device such as a display screen, or an input device (e.g., remote control device interfaced with the user interface directly or through an IO controller module). In some cases, user interface 115 includes a graphical user interface (GUI). For example, in some embodiments, the user provides a text prompt through a website including the GUI.

Figure 2:
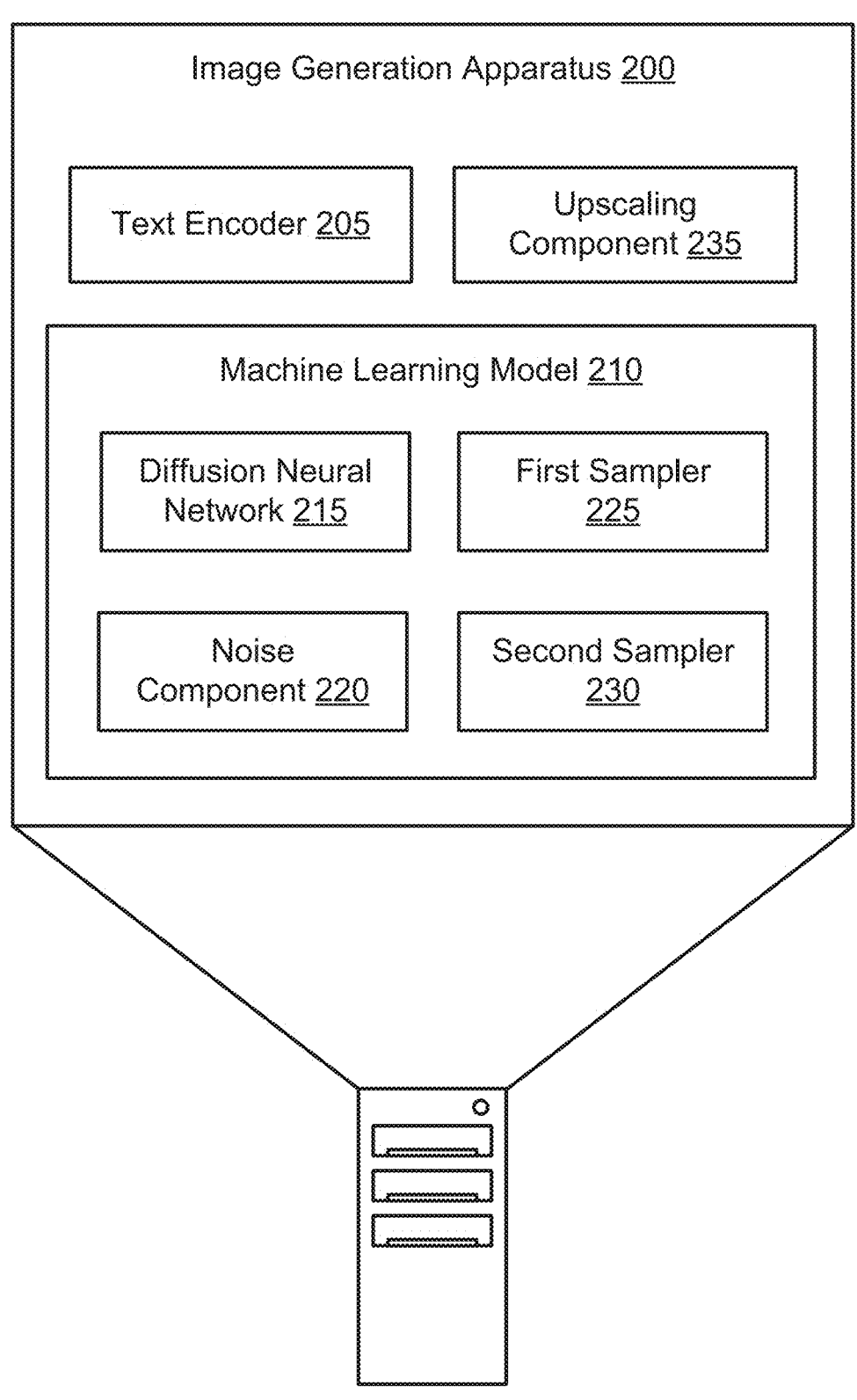
FIG. 2 shows an example of an image generation apparatus according to aspects of the present disclosure.

FIG. 2 shows an example of an image generation apparatus 200 according to aspects of the present disclosure. The example shown includes image generation apparatus 200, text encoder 205, machine learning model 210, and upscaling component 235. Image generation apparatus 200 is an example of, or includes aspects of, the corresponding element described with reference to FIG. 1. Text encoder 205 is an example of, or includes aspects of, the corresponding element described with reference to FIGS. 3 and 4.

Embodiments of machine learning model 210 one or more neural networks. A neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs. In some cases, text encoder 205, machine learning model 210, and upscaling component 235 each contain one or more neural networks. For example, text encoder 205 may include a transformer neural network, machine learning model 210 may include a diffusion neural network, and upscaling component 235 may include a generative adversarial network (GAN).

Text encoder 205 is configured to transform an input text into a text embedding. Embodiments of text encoder 205 include a transformer-based autoencoder. The text embedding is input into machine learning model 210 and used as a condition for image generation. Accordingly, machine learning model 210 can generate images including objects and scenes described in the input text. In some cases, text encoder 205 is pretrained in a training process that is separate from machine learning model 210. In at least one embodiment, text encoder 205 is trained along with machine learning model 210 in an end-to-end training process.

Machine learning model 210 is configured to generate images. In one aspect, machine learning model 210 includes diffusion neural network 215, noise component 220, first sampler 225, and second sampler 230.

Diffusion neural network 215 is configured to perform forward and reverse diffusion processes. The reverse diffusion process generates images based on a noise distribution using a sampling process that incorporates knowledge gathered during a training process. Diffusion neural network 215 is an example of, or includes aspects of, the corresponding element described with reference to FIGS. 3 and 4.

According to some aspects, diffusion neural network 215 generates a first denoised image based on the noisy image during a first reverse diffusion phase using a diffusion neural network 215, where the first denoised image is generated based on a first sampler 225. In some examples, diffusion neural network 215 generates a second denoised image based on the first denoised image during a second reverse diffusion phase using the diffusion neural network 215, where the second denoised image is generated based on a second sampler 230. In some examples, diffusion neural network 215 generates a third denoised image based on the second denoised image during a third reverse diffusion phase using the diffusion neural network 215, where the third denoised image is generated based on a third sampler. Additional detail regarding the diffusion process will be provided with reference to FIGS. 4-7.

Noise component 220 is configured to add noise to images during both forward and reverse diffusion processes. In conventional diffusion models, noise is only added during the forward process. By contrast, embodiments of the present disclosure are configured to re-add noise after some initially added noise has been removed during some iterations of the reverse diffusion process. In some cases, this re-injection of noise allows machine learning model 210 to explore additional generation paths, or to "course-correct" and generate features that are more accurate to the data distribution that was accumulated during a training phase or that are in better alignment with a text prompt.

First sampler 225 and second sampler 230 are configured to guide the sampling process of diffusion neural network 215 by controlling aspects of the reverse diffusion process. According to some embodiments, first sampler 225 determines a first noise injection schedule, predicts noise using a first solver, and determines a first sampling rate (i.e., a density corresponding to which timesteps are skipped with respect to a conventional reverse diffusion process). According to some embodiments, second sampler 230 determines a second noise injection schedule, predicts noise using a second solver, and determines a second sampling rate.

In some aspects, the first sampler 225 uses a first sampling density during at least a portion of the first reverse diffusion phase, the second sampler 230 uses a second sampling density during at least a portion of the second reverse diffusion phase, and where the first sampling density is greater than the second sampling density. In some aspects, the first sampler 225 is based on a denoising diffusion implicit model (DDIM) and the second sampler 230 is based on a diffusion probabilistic model (DPM). In some aspects, the first sampler 225 is based on a lower-order differential equation solver and the second sampler 230 is based on a higher-order differential equation solver. In some aspects, the first sampler 225 injects noise during the first reverse diffusion phase, and the second sampler 230 does not inject noise during the second reverse diffusion phase.

According to some aspects, noise component 220 injects noise during each iteration of the first reverse diffusion phase, e.g., under direction from first sampler 225. In some examples, noise component 220 refrains from injecting noise during each iteration of the second reverse diffusion phase under direction from second sampler 230. In some examples, noise component 220 refrains from injecting noise during the third reverse diffusion phase under direction from a third sampler.

Upscaling component 235 is configured to upscale an output of machine learning model 210 to a higher resolution. Embodiments of upscaling component 235 include a GAN model. In some cases, upscaling component 235 conditionally upscales the output of machine learning model 210 based on a text embedding from text encoder 205. Upscaling component 235 is an example of, or includes aspects of, the corresponding element described with reference to FIG. 3.

Figure 3:
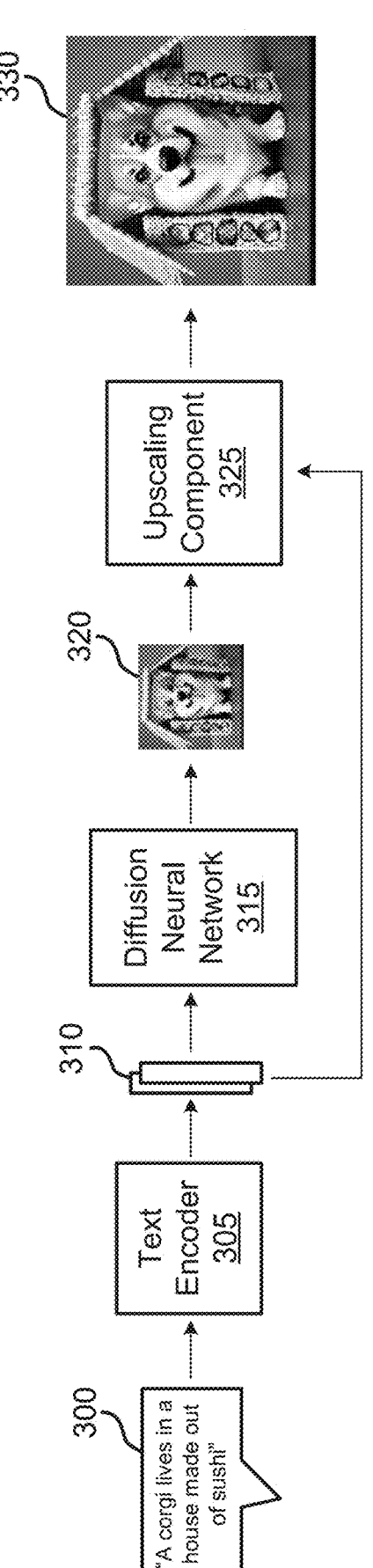
FIG. 3 shows an example of an image generation pipeline according to aspects of the present disclosure.

FIG. 3 shows an example of an image generation pipeline according to aspects of the present disclosure. The example shown includes text prompt 300, text encoder 305, text embedding 310, diffusion neural network 315, generated image 320, upscaling component 325, and upscaled generated image 330. Text prompt 300 and upscaling component 325 are examples of, or include aspects of, the corresponding elements described with reference to FIG. 4. Text encoder 305 and diffusion neural network 315 are examples of, or include aspects of, the corresponding elements described with reference to FIGS. 2 and 4.

In an example, a user provides a text prompt 300 describing objects, scenes, or other aspects they wish to generate from the system. Text encoder 305 processes the text prompt 300 to produce a text embedding 310, which includes a vector of numbers that encodes various information. Some embodiments of text encoder 305 are based on a transformer architecture or a CLIP model.

Diffusion neural network 315 processes the text embedding 310 by incorporating it into a reverse diffusion process to produce generated image 320. Upscaling component 325 processes generated image 320 to increase its resolution and produce upscaling generated image 330. In some cases, upscaling component 325 also uses the text embedding 310 as conditional features during the upscaling process. Embodiments of the diffusion neural network 315 and the forward and reverse diffusion processes will now be described with reference to FIGS. 4-7. Detail regarding hybrid sampling methods will be provided further on with reference to FIGS. 8-12.

Diffusion Process

Figure 4:
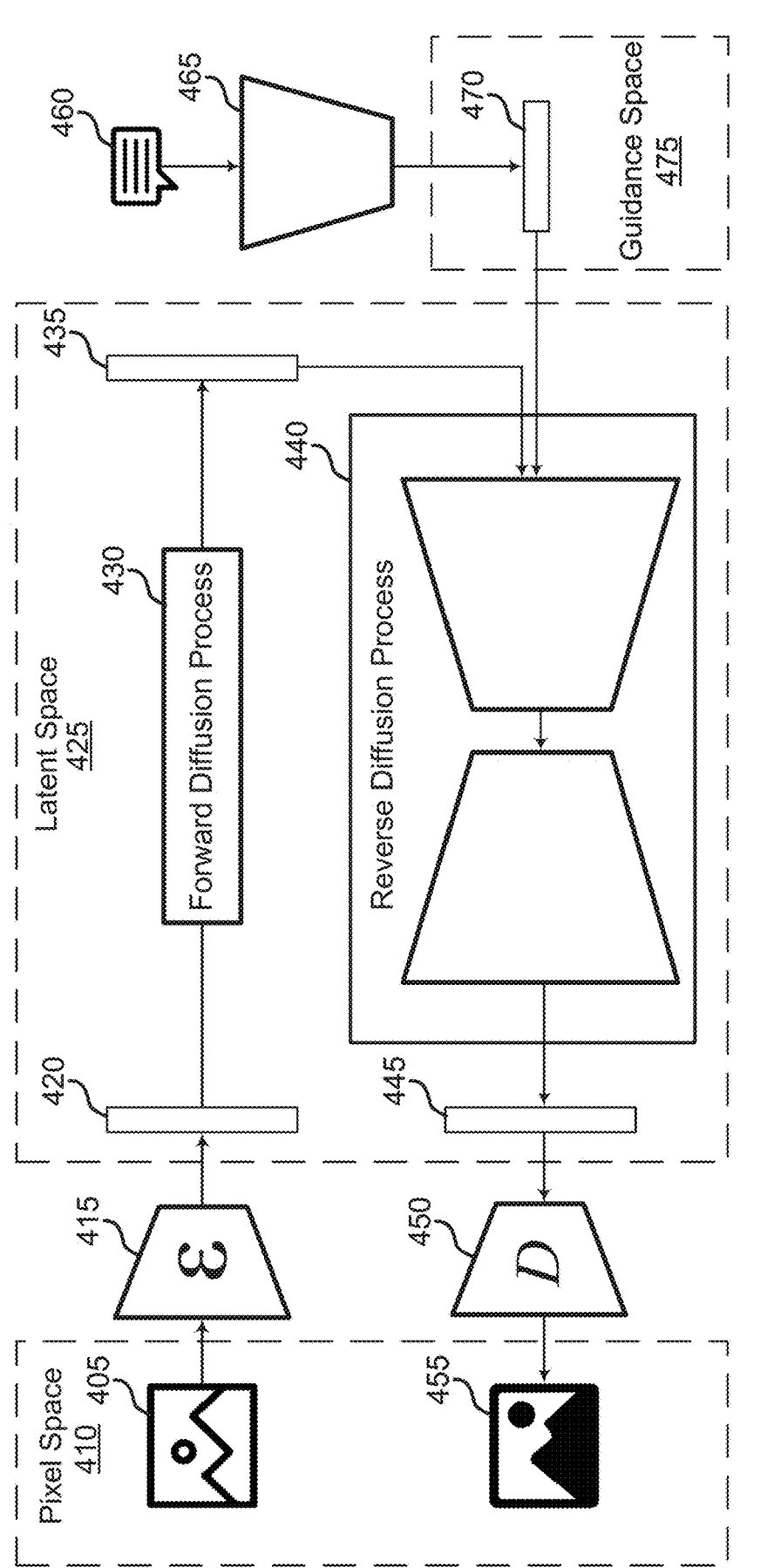
FIG. 4 shows an example of a diffusion neural network according to aspects of the present disclosure.

FIG. 4 shows an example of a diffusion neural network 400 according to aspects of the present disclosure. The diffusion neural network 400 depicted in FIG. 4 is an example of, or includes aspects of, the corresponding element described with reference to FIG. 2. The example shown includes diffusion neural network 400, original image 405, pixel space 410, image encoder 415, original image features 420, latent space 425, forward diffusion process 430, noisy features 435, reverse diffusion process 440, denoised image features 445, image decoder 450, output image 455, text prompt 460, text encoder 465, guidance features 470, and guidance space 475. Diffusion neural network 400 is an example of, or includes aspects of, the corresponding element described with reference to FIGS. 2 and 3. Text encoder 465 is an example of, or includes aspects of, the corresponding element described with reference to FIGS. 2 and 3.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, diffusion neural network 400 may take an original image 405 in a pixel space 410 as input and apply and image encoder 415 to convert original image 405 into original image features 420 in a latent space 425. Then, a forward diffusion process 430 gradually adds noise to the original image features 420 to obtain noisy features 435 (also in latent space 425) at various noise levels.

Next, a reverse diffusion process 440 (e.g., a U-Net ANN) gradually removes the noise from the noisy features 435 at the various noise levels to obtain denoised image features 445 in latent space 425. In some examples, the denoised image features 445 are compared to the original image features 420 at each of the various noise levels, and parameters of the reverse diffusion process 440 of the diffusion model are updated based on the comparison. In some embodiments, as will be described with reference to FIGS. 8-12, the parameters are updated according to first and second samplers configured to predict a noise of a sample corresponding to a current iteration of the reverse diffusion process 440. Finally, an image decoder 450 decodes the denoised image features 445 to obtain an output image 455 in pixel space 410. In some cases, an output image 455 is created at each of the various noise levels. The output image 455 can be compared to the original image 405 to train the reverse diffusion process 440.

In some cases, image encoder 415 and image decoder 450 are pre-trained prior to training the reverse diffusion process 440. In some examples, they are trained jointly, or the image encoder 415 and image decoder 450 and fine-tuned jointly with the reverse diffusion process 440.

The reverse diffusion process 440 can also be guided based on a text prompt 460, or another guidance prompt, such as an image, a layout, a segmentation map, etc. The text prompt 460 can be encoded using a text encoder 465 (e.g., a multimodal encoder) to obtain guidance features 470 in guidance space 475. The guidance features 470 can be combined with the noisy features 435 at one or more layers of the reverse diffusion process 440 to ensure that the output image 455 includes content described by the text prompt 460. For example, guidance features 470 can be combined with the noisy features 435 using a cross-attention block within the reverse diffusion process 440.

Figure 5:
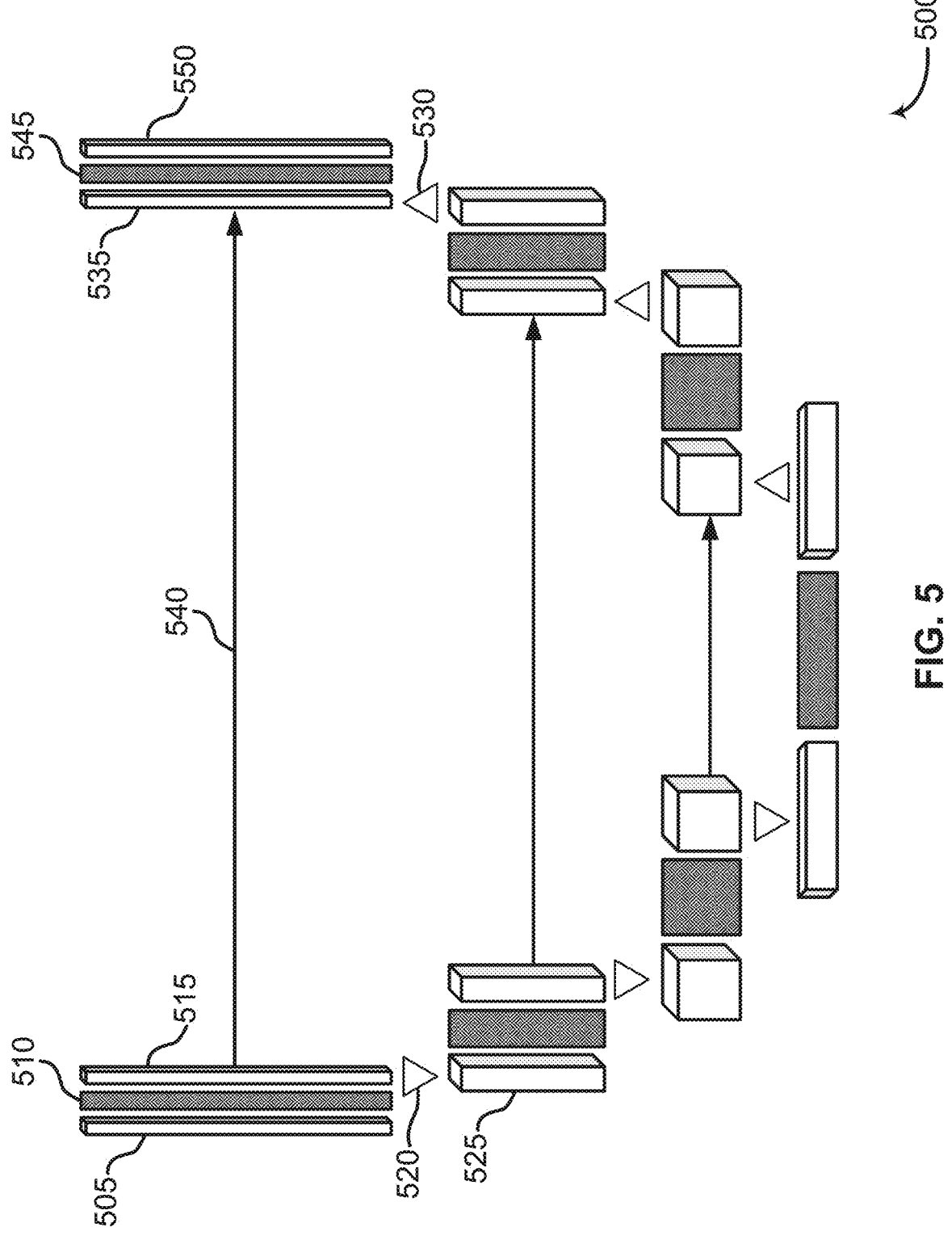
FIG. 5 shows an example of an architecture of a reverse diffusion process according to aspects of the present disclosure.

FIG. 5 shows an example of an architecture of a reverse diffusion process according to aspects of the present disclosure. The example shown includes U-Net 500, input features 505, initial neural network layer 510, intermediate features 515, down-sampling layer 520, down-sampled features 525, up-sampling process 530, up-sampling features 535, skip connection 540, final neural network layer 545, and output features 550. The U-Net 300 depicted in FIG. 3 is an example of, or includes aspects of, the architecture used within the reverse diffusion process described with reference to FIG. 4.

In some examples, diffusion models are based on a neural network architecture known as a U-Net. The U-Net 500 takes input features 505 having an initial resolution and an initial number of channels, and processes the input features 505 using an initial neural network layer 510 (e.g., a convolutional network layer) to produce intermediate features 515. The intermediate features 515 are then down-sampled using a down-sampling layer 520 such that down-sampled features 525 features have a resolution less than the initial resolution and a number of channels greater than the initial number of channels.

This process is repeated multiple times, and then the process is reversed. That is, the down-sampled features 525 are up-sampled using up-sampling process 530 to obtain up-sampled features 535. The up-sampled features 535 can be combined with intermediate features 515 having a same resolution and number of channels via a skip connection 540. These inputs are processed using a final neural network layer 545 to produce output features 550. In some cases, the output features 550 have the same resolution as the initial resolution and the same number of channels as the initial number of channels.

In some cases, U-Net 500 takes additional input features to produce conditionally generated output. For example, the additional input features could include a vector representation of an input prompt, such as the prompts described with reference to FIGS. 2-4. The additional input features can be combined with the intermediate features 515 within the neural network at one or more layers. For example, a cross-attention module can be used to combine the additional input features and the intermediate features 515.

Figure 6:
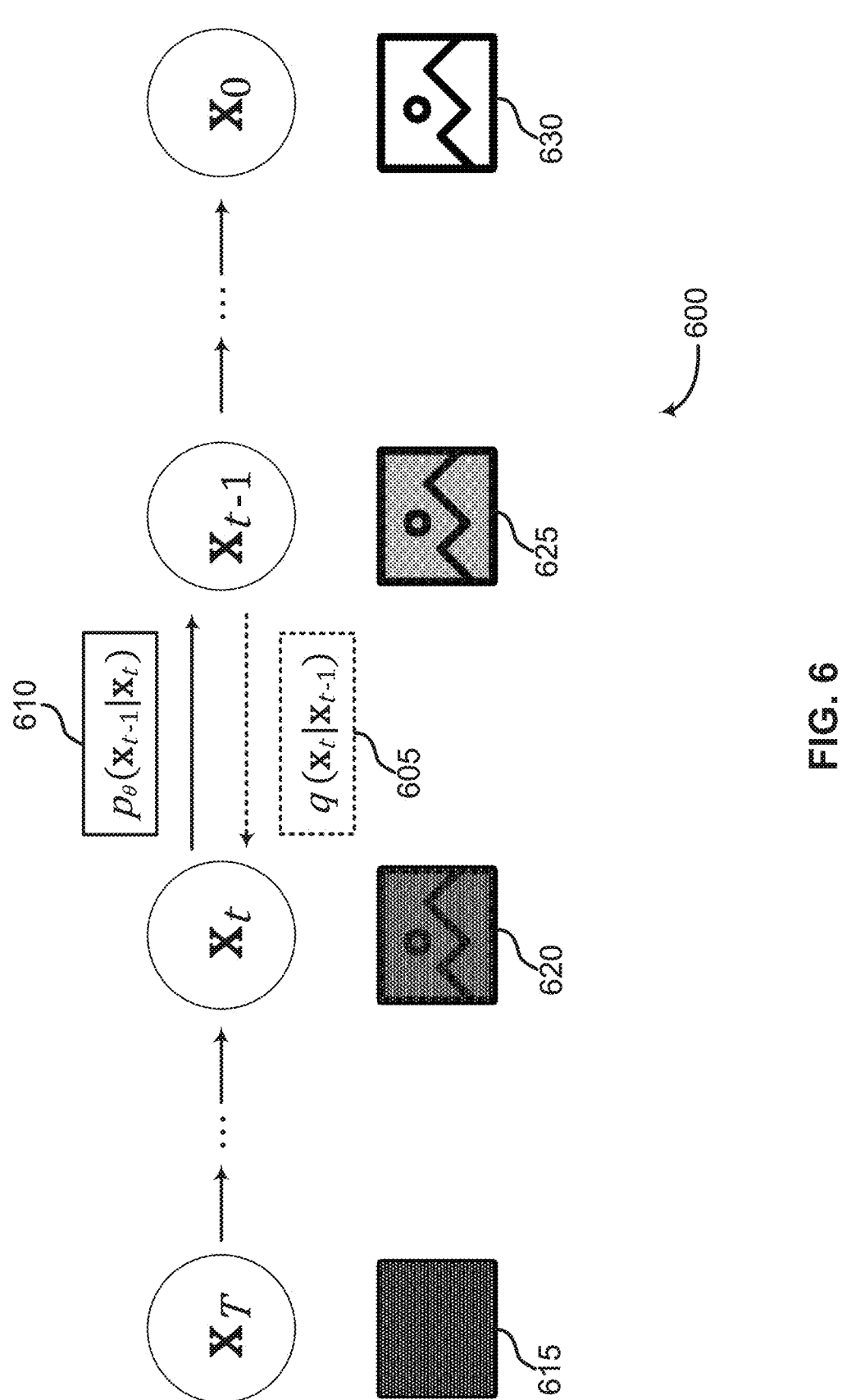
FIG. 6 shows an example of a diffusion process according to aspects of the present disclosure.

FIG. 6 shows an example of a diffusion process 600 according to aspects of the present disclosure. The example shown includes diffusion process 600, forward diffusion process 605, reverse diffusion process 610, noisy image 615, first intermediate image 620, second intermediate image 625, and original image 630.

As described above with reference to FIG. 4, a diffusion model can include both a forward diffusion process 605 for adding noise to an image (or features in a latent space) and a reverse diffusion process 610 for denoising the images (or features) to obtain a denoised image. The forward diffusion process 605 can be represented as $q(x_t|x_{t-1})$, and the reverse diffusion process 610 can be represented as $p(x_{t-1}|x_t)$. In some cases, the forward diffusion process 605 is used during training to generate images with successively greater noise, and a neural network is trained to perform the reverse diffusion process 610 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 610, the model begins with noisy data $x_T$, such as a noisy image 615 and denoises the data to obtain the $p(x_{t-1}|x_t)$. At each step $t-1$, the reverse diffusion process 610 takes $x_t$, such as first intermediate image 620, and t as input. Here, t represents a step in the sequence of transitions associated with different noise levels, The reverse diffusion process 610 outputs $x_{t-1}$, such as second intermediate image 625 iteratively until $x_T$ is reverted back to $x_0$, the original image 630. The reverse process can be represented as:

$$p_\theta(x_{t-1} \mid x_t) := N\left(x_{t-1}; \mu_\theta(x_t, t), \sum\nolimits_\theta(x_t, t)\right). \qquad (1)$$

The joint probability of a sequence of samples in the Markov chain can be written as a product of conditionals and the marginal probability:

$$x_T: \ p_\theta(x_{0:T}) := p(x_T)\prod\nolimits_{t=1}^{T} p_\theta(x_{t-1} \mid x_t), \qquad (2)$$

where $p(x_T)=N(x_T;0,I)$ is the pure noise distribution as the reverse process takes the outcome of the forward process, a sample of pure noise, as input and $$\prod\nolimits_{t=1}^{T} p_\theta(x_{t-1}|x_t)$$

represents a sequence of Gaussian transitions corresponding to a sequence of addition of Gaussian noise to the sample.

At interference time, observed data $x_0$ in a pixel space can be mapped into a latent space as input and a generated data $\bar{x}$ is mapped back into the pixel space from the latent space as output. In some examples, $x_0$ represents an original input image with low image quality, latent variables $x_1, \ldots, x_T$ represent noisy images, and x represents the generated image with high image quality.

Figure 7:
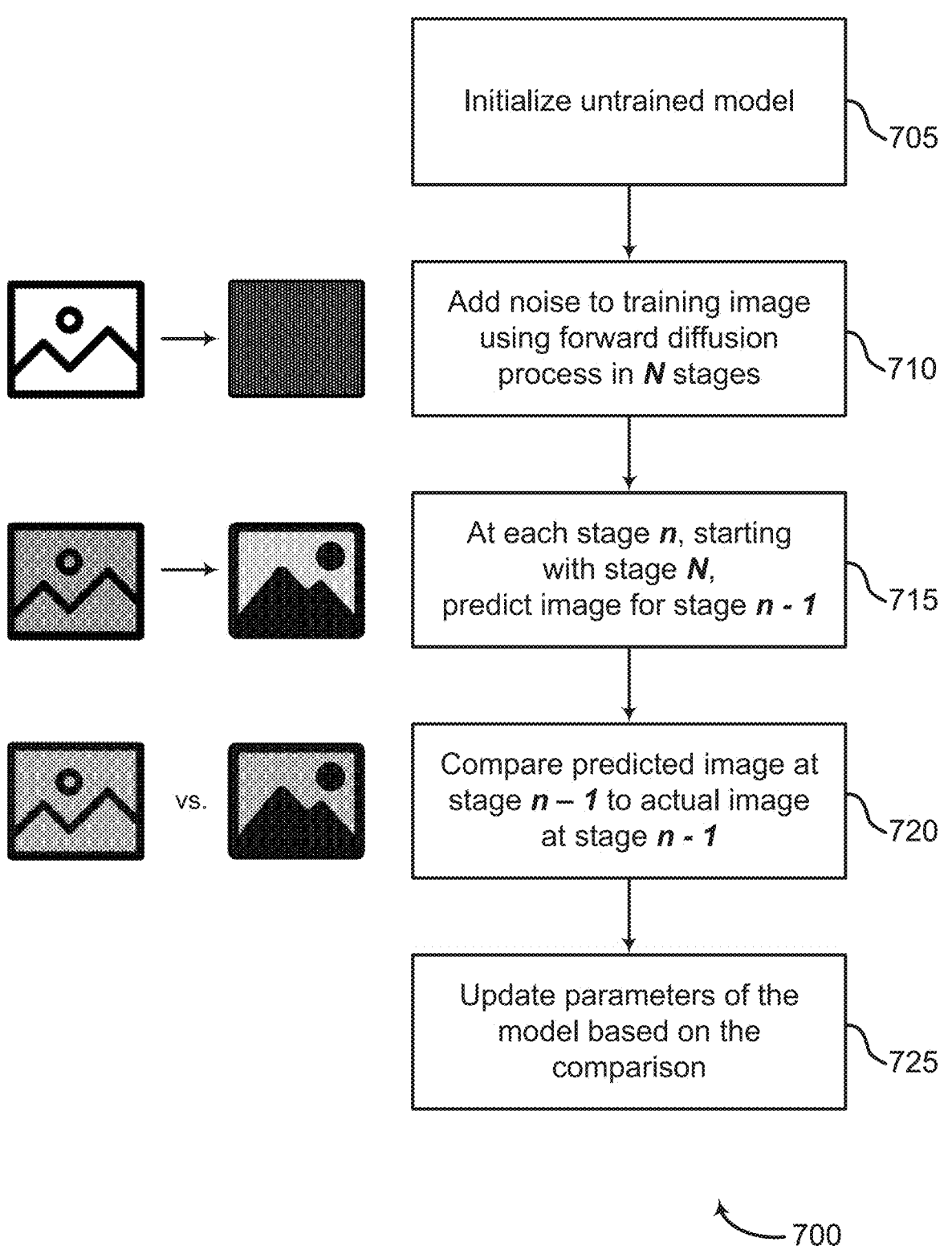
FIG. 7 shows an example of a method of a training process for a diffusion neural network according to aspects of the present disclosure.

FIG. 7 shows an example of a method 700 for training a reverse diffusion process as described above with reference to FIG. 4. In some examples, these operations are performed by a system including a processor executing a set of codes to control functional elements of an apparatus, such as the apparatus described in FIG. 2.

Additionally or alternatively, certain processes of method 700 may be performed using special-purpose hardware. Generally, these operations are performed according to the methods and processes described in accordance with aspects of the present disclosure. In some cases, the operations described herein are composed of various substeps, or are performed in conjunction with other operations.

At operation 705, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

At operation 710, the system adds noise to a training image using a forward diffusion process in N stages. In some cases, the forward diffusion process is a fixed process where Gaussian noise is successively added to an image. In latent diffusion models, the Gaussian noise may be successively added to features in a latent space.

At operation 715, the system at each stage n, starting with stage N, a reverse diffusion process is used to predict the image or image features at stage $n-1$. For example, the reverse diffusion process can predict the noise that was added by the forward diffusion process, and the predicted noise can be removed from the image to obtain the predicted image. In some cases, an original image is predicted at each stage of the training process.

At operation 720, the system compares predicted image (or image features) at stage $n-1$ to an actual image (or image features), such as the image at stage $n-1$ or the original input image. For example, given observed data x, the diffusion model may be trained to minimize the variational upper bound of the negative log-likelihood $-\log p_\theta(x)$ of the training data.

At operation 725, the system updates parameters of the model based on the comparison. For example, parameters of a U-Net may be updated using gradient descent. Time-dependent parameters of the Gaussian transitions can also be learned.

Hybrid Sampling

A method for operation of a generative diffusion model is described. One or more aspects of the method include obtaining a noisy image; generating a first denoised image based on the noisy image during a first reverse diffusion phase using a diffusion neural network, wherein the first denoised image is generated based on a first sampler that uses a first sampling density during at least a portion of the first reverse diffusion phase; and generating a second denoised image based on the first denoised image during a second reverse diffusion phase using the diffusion neural network, wherein the second denoised image is generated based on a second sampler that uses a second sampling density different from the first sampling density during at least a portion of the second reverse diffusion phase.

In some aspects, the first sampling density is greater than the second sampling density. In some aspects, the first sampler is based on a denoising diffusion implicit model (DDIM) and the second sampler is based on a diffusion probabilistic model (DPM). In some aspects, the first sampler is based on a lower order differential equation solver and the second sampler is based on a higher order differential equation solver.

Some examples of the method, apparatus, non-transitory computer readable medium, and system further include injecting noise during each iteration of the first reverse diffusion phase. Some examples further include refraining from injecting noise during each iteration of the second reverse diffusion phase.

Some examples of the method, apparatus, non-transitory computer readable medium, and system further include generating a third denoised image based on the second denoised image during a third reverse diffusion phase using the diffusion neural network, wherein the third denoised image is generated based on a third sampler. Some examples further include refraining from injecting noise during the third reverse diffusion phase. In some aspects, the third sampler is based on a DDIM. In some aspects, the third sampler is based on a lower order differential equation solver and the second sampler is based on a higher order differential equation solver.

Another method for an operation of generative diffusion models is described. One or more aspects of the method include obtaining a noisy image; generating a first denoised image based on the noisy image during a first reverse diffusion phase using a diffusion neural network; injecting noise into the first denoised image during the first reverse diffusion phase; and generating a second denoised image based on the first denoised image and the noise injection from the first reverse diffusion phase, wherein the second denoised image is generated during a second reverse diffusion phase using the diffusion neural network without injecting noise during the second reverse diffusion phase.

Some examples of the method, apparatus, non-transitory computer readable medium, and system further include identifying a diffusion time step during the first reverse diffusion phase. Some examples further include removing noise from the noisy image based on the diffusion time step using a first sampler to obtain the first denoised image, wherein the first sampler operates based on the noise injection.

Some examples of the method, apparatus, non-transitory computer readable medium, and system further include identifying an additional diffusion time step during the first reverse diffusion phase. Some examples further include removing noise at the additional diffusion time step using the first sampler.

Some examples of the method, apparatus, non-transitory computer readable medium, and system further include identifying a diffusion time step during the second reverse diffusion phase. Some examples further include removing noise from the noisy image based on the diffusion time step using a second sampler to obtain the second denoised image, wherein the second sampler operates without noise injection.

Some examples of the method, apparatus, non-transitory computer readable medium, and system further include identifying an additional diffusion time step during the second reverse diffusion phase. Some examples further include removing noise at the additional diffusion time step using the second sampler.

Figure 8:
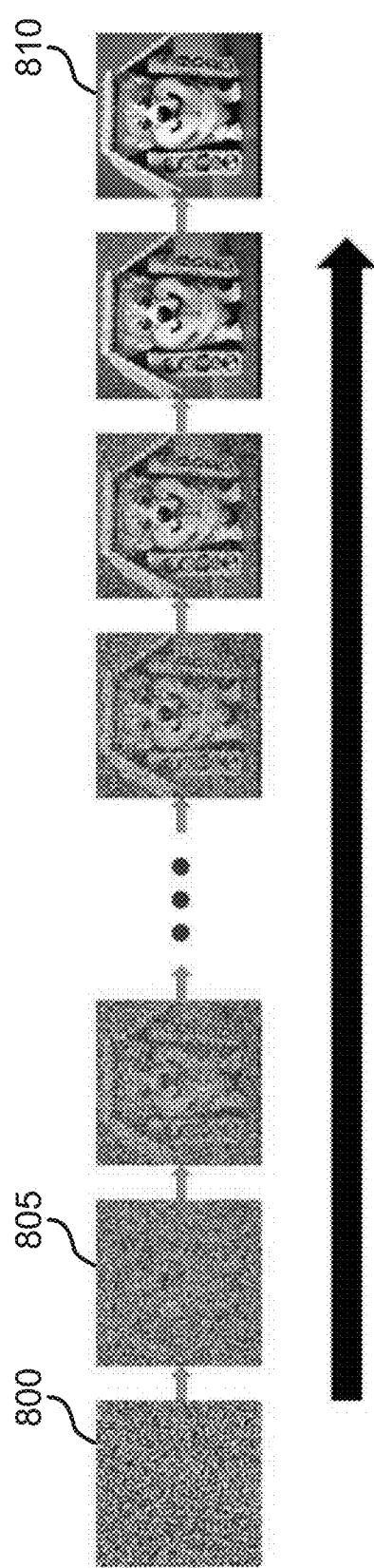
FIG. 8 shows an example of a conventional inference process with many steps according to aspects of the present disclosure.

FIG. 8 shows an example of a conventional inference process with many steps according to aspects of the present disclosure. The example shown includes pure noise image 800, first iteration 805, and output image 810.

The example shown illustrates a conventional inference process with many time steps. A "time-step" describes a round of denoising, e.g., using a reverse diffusion process as described with reference to FIGS. 4-7. In a conventional denoising diffusion model, inference may include upwards of 1000 iterations or more. For example, the " . . . " in FIG. 8 may represent approximately 993 iterations in the generation of output image 810.

In some cases, the large number of iterations is used to ensure stability during the inference process. However, this can result in very slow inference times.

Figure 9:
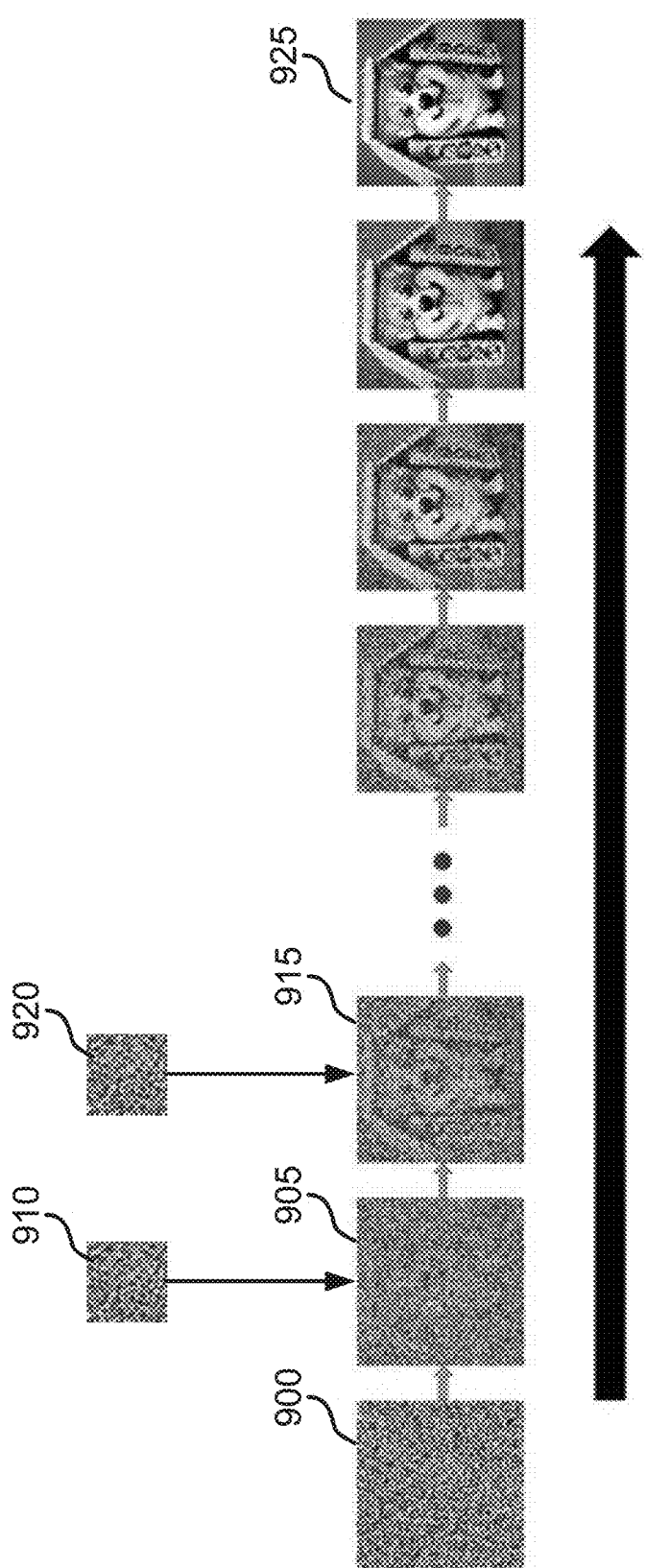
FIG. 9 shows an example of an inference process using hybrid sampling according to aspects of the present disclosure.

By contrast, FIG. 9 shows an example of an inference process using hybrid sampling according to aspects of the present disclosure. The example shown includes pure noise image 900, first iteration noisy image 905, first injected noise 910, second iteration noisy image 915, second injected noise 920, and output image 925.

In some cases, generating an output image via reverse diffusion using fewer iterations than the number used during the forward diffusion process can result in a lack of details or poor text-image alignment. However, embodiments of the present application include a hybrid sampling method that includes a first sampler and a second sampler that control the sampling process such that using fewer iterations is possible. In some cases, embodiments can generate an image in approximately 50 iterations that is highly detailed and aligned with an input prompt.

In an example, a first sampler controls a denoising operation by removing a first amount of noise from pure noise image 900 to produce first iteration noisy image 905. For example, a diffusion neural network as described with reference to FIG. 4 may predict a noise from pure noise image 900 that can be removed, and the first sampler may determine how much of the prediction is applied to pure noise image 900 using a differential equation solver. In one embodiment, the first sampler may remove a relatively small amount of noise in the first few iterations corresponding to a large sampling density. For example, in a 1000-timestep schedule, the first sampler may skip only 1 or two timesteps in the process of producing first iteration noisy image 905.

In some cases, the first sampler adds back a small amount of noise to the image, and this image is used as first iteration noisy image 905. The amount of noise added back to the image is less than the amount of noise removed during processing. In some cases, the re-addition of noise allows the model to explore additional possibilities during the generation and to correct mistakes. The first sampler may then proceed similarly in the process of producing second iteration noisy image 915. In at least one embodiment, the first sampler denoises using a solver based on a denoising diffusion implicit model (DDIM).

A second sampler may take control during the final iterations of the inference process. In some cases, the second sampler denoises the intermediate images more aggressively, corresponding to a smaller sampling density. For example, in a 1000-timestep schedule, the second sampler may skip upwards of 30 steps during the reverse diffusion process. In the example shown, the second sampler does not include a re-addition of noise. In at least one embodiment, the second sampler uses a solver based on a diffusion probabilistic model (DPM).

FIG. 10 shows an example of a method 1000 for generating an image according to aspects of the present disclosure. In some examples, these operations include obtaining a noisy image, and then denoises the noisy image in two distinct phases, e.g., a first reverse diffusion phase and a second reserve diffusion phrase using the same diffusion neural network. In each of the first and the second reverse diffusion phases, a different sampler is used to generate denoised image. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system obtains a noisy image. In some cases, the operations of this step refer to, or may be performed by, an image generation apparatus as described with reference to FIGS. 1 and 2. A diffusion neural network of the apparatus may generate a noisy image from a distribution such as a Gaussian distribution.

At operation 1010, the system generates a first denoised image based on the noisy image during a first reverse diffusion phase using a diffusion neural network, where the first denoised image is generated based on a first sampler. In some cases, the operations of this step refer to, or may be performed by, a diffusion neural network as described with reference to FIGS. 4-7. According to some aspects, the first sampler uses a first sampling density during at least a portion of the first reverse diffusion phase. The denoising may be conditioned, e.g., from a text prompt as described with reference to FIGS. 3-4. Accordingly, an image containing elements from an input text may be generated.

The first sampler may denoise the noisy image according to a first differential equation solver. In some examples, this solver is a DDIM solver. In at least one example, the first solver instructs a noise component of the apparatus to re-inject an amount of noise, and this version of the image is used as the first denoised image.

At operation 1015, the system generates a second denoised image based on the first denoised image during a second reverse diffusion phase using the diffusion neural network, where the second denoised image is generated based on a second sampler. According to some aspects, the second sampler uses a second sampling density different from the first sampling density during at least a portion of the second reverse diffusion phase. The second sampler may denoise the image according to a second differential equation solver. In some examples, this solver is a DPM solver. The first reverse diffusion phase and the second reverse are steps within the same overall reverse diffusion process implemented using the diffusion neural network. The "first sampler" and the "second sampler" may refer to different methods or algorithms used to denoise the image during the reverse diffusion process. In some embodiments, the first sampler differs from the second sampler in sampling density (i.e., the amount of noise removed at each iteration), the differential equation solver used for denoising, the use of noise injection after denoising, or some combination of these.

Figure 11:
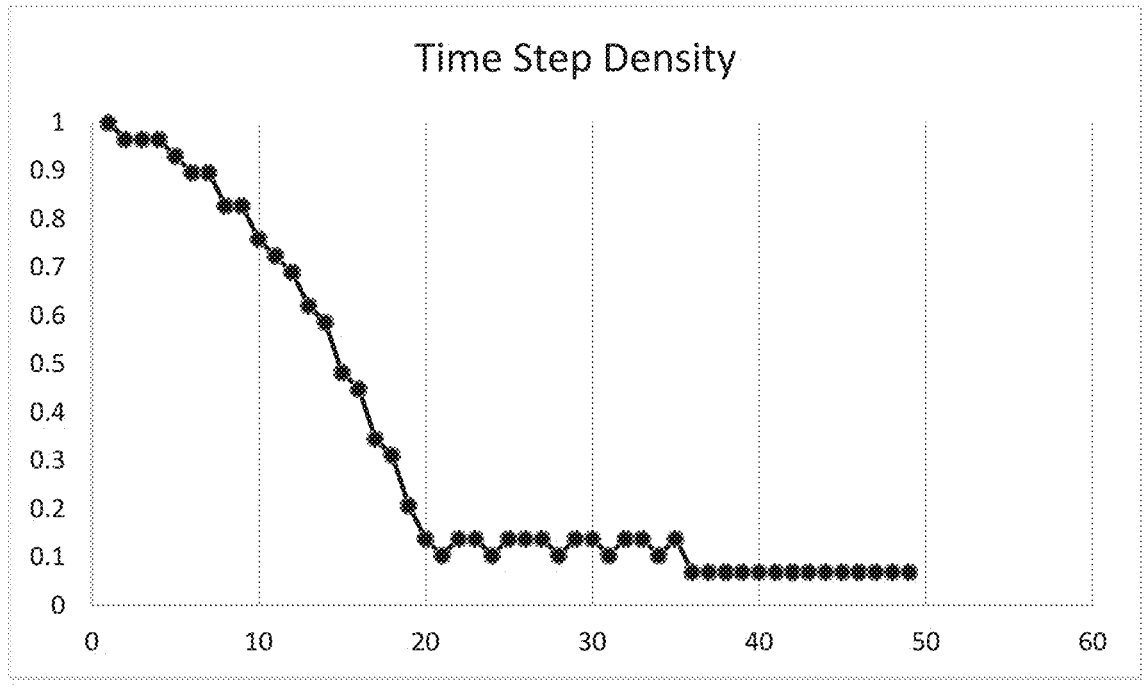
FIG. 11 shows an example of a time step density schedule according to aspects of the present disclosure.

FIG. 11 shows an example of a time step density schedule 1100 according to aspects of the present disclosure. A reverse diffusion process, such as the one described with reference to FIGS. 4-7, includes multiple iterations to gradually remove noise from a sample and generate new, less noisy samples with each step. These iterations can be referred to as time steps. A sampler computes an amount of noise to remove for a current time step based on a time step schedule.

Embodiments of the present disclosure are configured to remove noise more aggressively than conventional diffusion models. Accordingly, with respect to a conventional 1000-time step inference process, embodiments of the present disclosure effectively skip many of the time steps. The time step density schedule 1100 illustrates an example scheduling (e.g., a representation of which time steps are skipped) by an embodiment of the present disclosure. Near the beginning, the embodiment may have a density of approximately 1.0 with respect to the conventional 1000-time step inference process, and might not skip a step in the first iteration. However, as the inference processes, the density reduces, and the embodiment may skip several steps. For example, near the end of the inference process, the embodiment may skip approximately 30 steps at a time with respect to the 1000-time step inference process. Accordingly, embodiments are configured to generate images in as few as 50 or so iterations, thereby drastically reducing inference time with respect to a conventional diffusion model.

FIG. 12 shows an example of a method 1200 for generating an image using hybrid sampling according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system obtains a noisy image. In some cases, the operations of this step refer to, or may be performed by, an image generation apparatus as described with reference to FIGS. 1 and 2. A diffusion neural network of the apparatus may generate a noisy image from a distribution such as a Gaussian distribution.

At operation 1210, the system generates a first denoised image based on the noisy image during a first reverse diffusion phase using a diffusion neural network, where the first denoised image is generated based on a first sampler using a first sampling density. In some cases, the first sampling density may be a relatively high density, e.g., the first sampler may skip few time steps, if any.

At operation 1215, the system generates a second denoised image based on the first denoised image during a second reverse diffusion phase using the diffusion neural network, where the second denoised image is generated based on a second sampler using a second sampling density lesser than the first sampling density. Since the second sampling density is lower, the second sampler may skip many time steps with respect to a 1000-timestep process. In this way, embodiments are configured to generate images quickly in a reduced number of iterations.

FIG. 13 shows an example of a computing device 1300 configured implement an image generation apparatus according to aspects of the present disclosure. The example shown includes computing device 1300, processor(s), memory subsystem 1310, communication interface 1315, I/O interface 1320, user interface component(s), and channel 1330.

In some embodiments, computing device 1300 is an example of, or includes aspects of, image generation apparatus 100 of FIG. 1. In some embodiments, computing device 1300 includes one or more processors 1305 that can execute instructions stored in memory subsystem 1310 to obtain a noisy image; generate a first denoised image based on the noisy image during a first reverse diffusion phase using a diffusion neural network, wherein the first denoised image is generated based on a first sampler; and generate a second denoised image based on the first denoised image during a second reverse diffusion phase using the diffusion neural network, wherein the second denoised image is generated based on a second sampler.

According to some aspects, computing device 1300 includes one or more processors 1305. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1310 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1315 operates at a boundary between communicating entities (such as computing device 1300, one or more user devices, a cloud, and one or more databases) and channel 1330 and can record and process communications. In some cases, communication interface 1315 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1320 is controlled by an I/O controller to manage input and output signals for computing device 1300. In some cases, I/O interface 1320 manages peripherals not integrated into computing device 1300. In some cases, I/O interface 1320 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1320 or via hardware components controlled by the I/O controller.

According to some aspects, user interface component(s) 1325 enables a user to interact with computing device 1300. In some cases, user interface component(s) 1325 include an audio device, such as an external speaker system, an external display device such as a display screen, an input device (e.g., a remote control device interfaced with a user interface directly or through the I/O controller), or a combination thereof. In some cases, user interface component(s) 1325 include a GUI.

Accordingly, embodiments of the present disclosure are configured to execute a hybrid sampling process, enabling the embodiments to generate images with fewer iterations while maintaining high detail and text-image alignment. The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining a noisy image;
generating a first denoised image based on the noisy image during a first reverse diffusion phase using a diffusion neural network, wherein the first denoised image is generated based on a first sampler that uses a first sampling density during at least a portion of the first reverse diffusion phase; and
generating a second denoised image based on the first denoised image during a second reverse diffusion phase using the diffusion neural network, wherein the second denoised image is generated based on a second sampler that uses a second sampling density different from the first sampling density during at least a portion of the second reverse diffusion phase.

2. The method of claim 1, wherein:
the first sampler uses a first sampling density during at least a portion of the first reverse diffusion phase, the second sampler uses a second sampling density during at least a portion of the second reverse diffusion phase, and wherein the first sampling density is greater than the second sampling density.

3. The method of claim 1, wherein:
the first sampler is based on a denoising diffusion implicit model (DDIM) and the second sampler is based on a diffusion probabilistic model (DPM).

4. The method of claim 1, wherein:
the first sampler is based on a lower order differential equation solver and the second sampler is based on a higher order differential equation solver.

5. The method of claim 1, further comprising:
injecting noise during each iteration of the first reverse diffusion phase.

6. The method of claim 1, further comprising:
refraining from injecting noise during each iteration of the second reverse diffusion phase.

7. The method of claim 1, further comprising:
generating a third denoised image based on the second denoised image during a third reverse diffusion phase using the diffusion neural network, wherein the third denoised image is generated based on a third sampler.

8. The method of claim 7, further comprising:
refraining from injecting noise during the third reverse diffusion phase.

9. The method of claim 7, wherein:
the third sampler is based on a DDIM.

10. The method of claim 7, wherein:
the third sampler is based on a lower order differential equation solver and the second sampler is based on a higher order differential equation solver.

11. The method of claim 7, wherein:
the first sampler uses a first sampling density during at least a portion of the first reverse diffusion phase, the third sampler uses a third sampling density during at least a portion of the third reverse diffusion phase, and wherein the first sampling density is greater than the third sampling density.

12. A method comprising:
obtaining a noisy image;
generating a first denoised image based on the noisy image during a first reverse diffusion phase using a diffusion neural network;
injecting noise into the first denoised image during the first reverse diffusion phase; and
generating a second denoised image based on the first denoised image and the noise injection from the first reverse diffusion phase, wherein the second denoised image is generated during a second reverse diffusion phase using the diffusion neural network without injecting noise during the second reverse diffusion phase.

13. The method of claim 12, further comprising:
identifying a diffusion time step during the first reverse diffusion phase; and
removing noise from the noisy image based on the diffusion time step using a first sampler to obtain the first denoised image, wherein the first sampler operates based on the noise injection.

14. The method of claim 13, further comprising:
identifying an additional diffusion time step during the first reverse diffusion phase; and
removing noise at the additional diffusion time step using the first sampler.

15. The method of claim 12, further comprising:
identifying a diffusion time step during the second reverse diffusion phase; and
removing noise from the noisy image based on the diffusion time step using a second sampler to obtain the second denoised image, wherein the second sampler operates without noise injection.

16. The method of claim 15, further comprising:
identifying an additional diffusion time step during the second reverse diffusion phase; and
removing noise at the additional diffusion time step using the second sampler.

17. An apparatus comprising:
at least one processor;
at least one memory including instructions executable by the processor;
the apparatus further comprising a diffusion neural network comprising parameters stored in the at least one memory, wherein the diffusion neural network is configured to compute noise of a noisy image using a reverse diffusion process;

a first sampler configured to remove noise based on an output of the diffusion neural network using a first sampling density during a first reverse diffusion phase of the reverse diffusion process; and a second sampler configured to remove noise based on an output of the diffusion neural network using a second sampling density different from the first sampling density during a second reverse diffusion phase of the reverse diffusion process.

18. The apparatus of claim 17, wherein:

the first sampler injects noise during the first reverse diffusion phase, and the second sampler does not inject noise during the second reverse diffusion phase.

19. The apparatus of claim 17, further comprising:

a third sampler configured to remove noise based on an output of the diffusion neural network during a third reverse diffusion phase.

20. The apparatus of claim 17, wherein:

the diffusion neural network comprises a U-net architecture.

* * * * *